Patented Jan. 30, 1940

2,188,867

UNITED STATES PATENT OFFICE 2,188,867

SYNTHETIC RUBBER INK

Alfred B. Pöschel, Chicago, Ill., assignor to Meyercord Company, a corporation of Illinois

No Drawing. Application April 30, 1938,
Serial No. 205,252

2 Claims. (Cl. 260—32)

It is possible successfully to decorate flexible rubber articles with artistic designs, if these designs can be embodied in elastic rubber in light films which can then be cemented to or incorporated by vulcanization in rubber articles. In order for this practice to be commercially feasible, it must not be too expensive nor difficult to be carried out.

The films themselves can best be produced in the form of decalcomanias or transfers embodying a paper backing and a water soluble gum coating on which the designs are printed and which permits a backing to be detached from its ink film through the dissolving of the gum. In any event, and especially where each design requires the printing of a considerable number of colors, one after another, it is imperative that the printing itself shall be done rapidly and that there shall be rapid drying of the ink so that the sheets may be placed in stacks upon leaving the press and be ready to be passed through the same or another press to receive the next color.

The necessary rapidity of printing can be achieved only by rotogravure or intaglio printing which requires that the ink be of low viscosity. I have heretofore made an ink for this purpose by using a crude rubber or rubber latex, but have experienced rather serious difficulties in the use of the same. In the case of an ink having rubber latex as a base, the ink quickly decomposes on the rollers or in the ink fountain, making the printing results uncertain. This is due to the great chemical sensitivity of the rubber latex emulsion. Furthermore, the printing of superimposed layers of latex emulsion on gum coated paper is often unsatisfactory, and the resulting rubber film is apt to be too thin for successful transfer.

In the case of ink made from crude rubber, I have found that there is too rapid deterioration when the necessary vulcanizing agents are incorporated therein. Furthermore, the colloidal nature of India rubber seems not to permit the formation of a true solution and rotogravure inks compounded from dissolved crude rubber, especially when vulcanizing agents are included, have always the tendency to "string" or to "flip" during printing; this making it difficult to effect a clean wiping of the press plate by the doctor plate, which is essential in intaglio printing. Also, the adhesion of the printed rubber film or layer on the gum coated paper is rather weak, and this is liable to cause trouble in superimposed multicolor printing.

Therefore, although rubber transfers, when manufactured from latex or from crude India rubber inks, may otherwise be satisfactory, their manufacture is somewhat difficult and costly.

The object of the present invention is to produce an ink for rotogravure or intaglio printing which shall possess all of the desirable properties of rubber inks and be free from the objectionable ones.

I have discovered that all of the difficulties incident to the use of natural rubber as a base for an ink adapted for rotogravure or intaglio printing can be obviated by employing synthetic rubber as the base for such ink. The synthetic rubber which I have employed in inks for the commercial production, on a considerable scale, of decalcomanias or transfers by the rotogravure process is one of the vinyl acetylene type, (comprising 2 chloro-butadiene (1:3), that is manufactured under the trade name "Neoprene". This material forms a true solution with certain solvents. This solution can be formulated to give the desired degree of low viscosity, with the assurance that it will retain the necessary fluidity for a reasonable length of time, even after vulcanizing agents and coloring matter have been added.

The following is a typical formula for the preparation of my improved ink, the proportions being by weight:

| | Parts |
|---|---|
| Synthetic rubber ("Neoprene") | 1000 |
| Methyl iso butyl ketone | 2500 |
| Xylol | 2500 |
| Magnesium oxide | 100 |
| Zinc oxide | 50 |
| Rosin | 25 |
| Resinous oil | 25 |
| Antioxidants, beta-naphtyl-amine | 5 |
| Coloring matter as desired | |

In the foregoing formula the methyl iso butyl ketone and the xylol are the solvents; the magnesium and zinc oxides serve as vulcanizers; and the rosin and the resinous oil afford protection against scorching of the material in the mold, during curing, the resinous oil also serving as a softening agent.

Not only does ink prepared according to the above stated typical formula effectively retain its printing properties much longer than do India rubber inks, but its printing qualities are far superior to those of the latter inks. This is especially true with respect to superimposed printing, because the resistance of the printed film or layer against the suction and the pull of the highspeed printing operation is very much greater than in the case of India rubber. This permits a greater speed of operation and uninterrupted run of the printing press; and it also facilitates the cutting, handling and shipping of the finished transfers.

When it comes to the matter of applying the transfers to India rubber articles, no change in procedure is required from that by which natural rubber sheets or layers are applied; the synthetic rubber layer or film being so perfectly assimilated by and integrated with the natural rubber article during the molding and curing of the latter that it is impossible to perceive any material difference between the synthetic rubber layer and the underlying India rubber of which the article is made.

It will thus be seen that I have produced, from a synthetic rubber base, an ink for intaglio printing which makes it possible to print rapidly perfect films in superimposed multicolor effects, in half tones, or with rotogravure screen effect in designs of the same variety as to line, color and color gradation which is possible in ordinary rotogravure printing; the films having all of the characteristics necessary to permit flexible rubber articles to be effectively decorated in a manner that causes the decorative designs apparently to be contained directly in the rubber of the articles.

While I have illustrated and described with particularity only a single preferred form of my invention, I do not desire to be limited to the exact structural details thus illustrated and described; but intend to cover all forms and arrangements which come with the definitions of my invention constituting the appended claims.

I claim:

1. An intaglio printing ink of low viscosity and drying rapidly by evaporation, comprising synthetic rubber-like material of polymerized 2-chloro-butadiene (1:3) dispersed in a solvent mixture of about equal parts of methyl-isobutyl-ketone and xylol, finely dispersed zinc oxide, magnesium oxide, abietic acid (rosin) beta-naphtyl-amine, resinous oil (coal tar distillate) and coloring matter.

2. A low viscosity and rapidly drying printing ink for rotogravure printing, comprising:

|  | Parts |
|---|---|
| Synthetic rubber (polymerization product of 2-chloro-butadiene) | 1000 |
| Methyl-isobutyl-ketone | 2500 |
| Xylol | 2500 |
| Magnesium oxide | 100 |
| Zinc oxide | 50 |
| Abietic acid (rosin) | 25 |
| Resinous oil (coal tar distillate) | 25 |
| Beta-naphtyl-amine | 5 | and coloring matter.

ALFRED B. PÖSCHEL.